(12) United States Patent
Greening

(10) Patent No.: US 7,383,660 B2
(45) Date of Patent: Jun. 10, 2008

(54) FLYING INSECT TRAP

(76) Inventor: John Llewellyn Greening, Button Bridge Lane, Kinlet, Worcestershire (GB)

( * ) Notice: Subject to any disclaimer, the term of this patent is extended or adjusted under 35 U.S.C. 154(b) by 15 days.

(21) Appl. No.: 11/250,631

(22) Filed: Oct. 14, 2005

(65) Prior Publication Data

US 2006/0080888 A1 Apr. 20, 2006

Related U.S. Application Data

(60) Provisional application No. 60/619,440, filed on Oct. 15, 2004.

(51) Int. Cl.
*A01M 1/04* (2006.01)
*A01M 1/14* (2006.01)

(52) U.S. Cl. .......................... 43/113; 43/114
(58) Field of Classification Search ................ 43/113, 43/114
See application file for complete search history.

(56) References Cited

U.S. PATENT DOCUMENTS

| | | | | |
|---|---|---|---|---|
| 4,074,457 A | * | 2/1978 | Sato et al. ................. | 43/113 |
| 4,332,100 A | * | 6/1982 | Schneider .................. | 43/113 |
| 4,686,789 A | * | 8/1987 | Williams .................... | 43/113 |
| 5,425,197 A | * | 6/1995 | Smith ......................... | 43/113 |
| 5,513,465 A | * | 5/1996 | Demarest et al. .......... | 43/113 |
| 5,915,948 A | * | 6/1999 | Kunze et al. ............... | 43/114 |
| 5,950,355 A | * | 9/1999 | Gilbert ....................... | 43/113 |
| 6,108,966 A | * | 8/2000 | Otomo et al. .............. | 43/113 |
| 6,393,759 B1 | * | 5/2002 | Brown et al. .............. | 43/113 |
| 6,397,515 B1 | * | 6/2002 | Brown et al. .............. | 43/113 |
| 6,560,919 B2 | * | 5/2003 | Burrows et al. ............ | 43/113 |
| 7,143,542 B2 | * | 12/2006 | Taylor et al. ............... | 43/113 |
| 2004/0016173 A1 | * | 1/2004 | Tully et al. ................. | 43/114 |

* cited by examiner

*Primary Examiner*—Kurt Rowan
(74) *Attorney, Agent, or Firm*—Daniel S. Polley, P.A.

(57) ABSTRACT

An insect trap having a rear cover attached to a wall which is connected to a separate and removable front cover. The front cover can be primarily round in shape with a plurality of slats and a shiny exterior appearance. An adhesive member, such as a sticky board, can be attached to the rear surface of the front cover. A light bulb is disposed within a ballast/socket member attached to the front of the rear cover. Once plugged in, light from the bulb is primarily and substantially retained within the trap by its capture in view of the rounded ends of the rear cover. The light illuminates the trap itself to attract insects to the area between the rear and front covers where the adhesive member is positioned.

31 Claims, 8 Drawing Sheets

FLYING INSECT TRAP

This application claims priority to and the benefit of U.S. application Ser. No. 60/619,440, filed Oct. 15, 2004 which is incorporated by reference in its entirety herein.

FIELD OF THE INVENTION

The present invention relates generally to pest control devices and more particularly to a flying insect trap.

BACKGROUND OF THE INVENTION

Current indoor bug lights typical reflect light onto the wall and ceiling of a room as a way of attracting flying insects to the trap. These conventional traps are typically not pleasant in appearance and thus, distract from the overall ornamental decorative aspects of a room in which they are located. Given the physical appearance of the traps, and that their shining lights also calls to their attention, use for the traps is most likely to be found in a commercial establishment. The present invention is intended to overcome the problems of past insect traps which use light to attract insects for capture by the trap.

SUMMARY OF THE INVENTION

The present invention provides an insect trap primarily for attracting flying bugs such as, but not limited to, flies. The trap can include a rear cover which is connected to a separate and removable front cover. A light ballast or socket can be attached to a front surface of the rear cover, and a mounting mechanism can be attached to or otherwise associated with a back surface of the rear cover. The mounting mechanism can also serve as a housing for the wires or electronics associated with the light ballast/socket. A wire frame can be secured to the rear cover and can protrude outward from the front surface of the rear cover. The front cover can include slots for receipt of respective portions of the wire frame member to properly to secure the front cover to the rear cover.

The front cover can be primarily rounded in shape and can be formed to have a plurality of flats or slats. In one embodiment, the front cover can be constructed from a metal or aluminum material and can have a shiny exterior appearance. An adhesive member, such as a sticky board, can be attached to the rear surface of the front cover and can include a backing paper to protect the adhesive prior to its use. The adhesive member can cover a large portion of the rear surface of the front cover. However the size of the adhesive material is not limited to any particular portion of the rear surface of the front cover. The rear cover can be provided with rounded side, top and bottom ends or edges.

In use a bulb, such as but not limited to, a compact fluorescent bulb is disposed within the ballast/socket and the backing paper is removed from its attachment to the sticky board in order to expose the adhesive portion of the stick board. The front cover is than attached to the rear cover by placement of the slots of the front cover with the corresponding portions of the wire frame attached to the rear cover. The rear cover is then mounted to a surface, such as but not limited to a vertical wall, by conventional means. The plug portion of the electrical cord can then be plugged into a receptacle. Once plugged in, the light from the bulb is primarily and substantially retained within the housing by the capture of the light by the rounded side, top and bottom ends of the rear cover. Direct light and/or light reflected off the exposed rear surface of the front cover illuminates the trap itself to attract flying insects, as well as non-flying insects.

In one embodiment, a minimal insignificant or minor amount of light may also protrude onto a small portion of the wall adjacent to the attachment position of the trap on the wall. The attachment of the front cover to the rear cover can define a top opening and a bottom opening for entry by insects. Light is permitted to escape through either opening and insects enter the area define between the front and rear covers also through either opening where they are captured by a provided adhesive member, such as the sticky board. The light the escapes through the top and bottom opening is at least substantially captured by corresponding curved top and bottom ends of the rear cover. Elongated side openings can also be defined between the front cover and the rear cover, when the front cover is properly attached to the rear cover, to permit light to escape and be captured by the rounded side ends of the rear cover. Thus insects, such as flies attracted to the light, will enter either through bottom or top opening or possibly one of the side openings and ultimately be caught or captured by the exposed adhesive on the rear surface of the front cover. To replace the adhesive member and/or to change the light bulb, the front member is easily removed to permit easy access to the adhesive member and light bulb.

Given the aesthetically pleasing appearance of the present invention use of the trap in a room in a residential household does not distract from the overall aesthetic appearance of such room. However, it should be also recognized that use of the present invention is commercial establishments, as well as any other location, is also within the scope of the invention.

DETAIL DESCRIPTION OF THE PREFERRED EMBODIMENT

Figure 1:
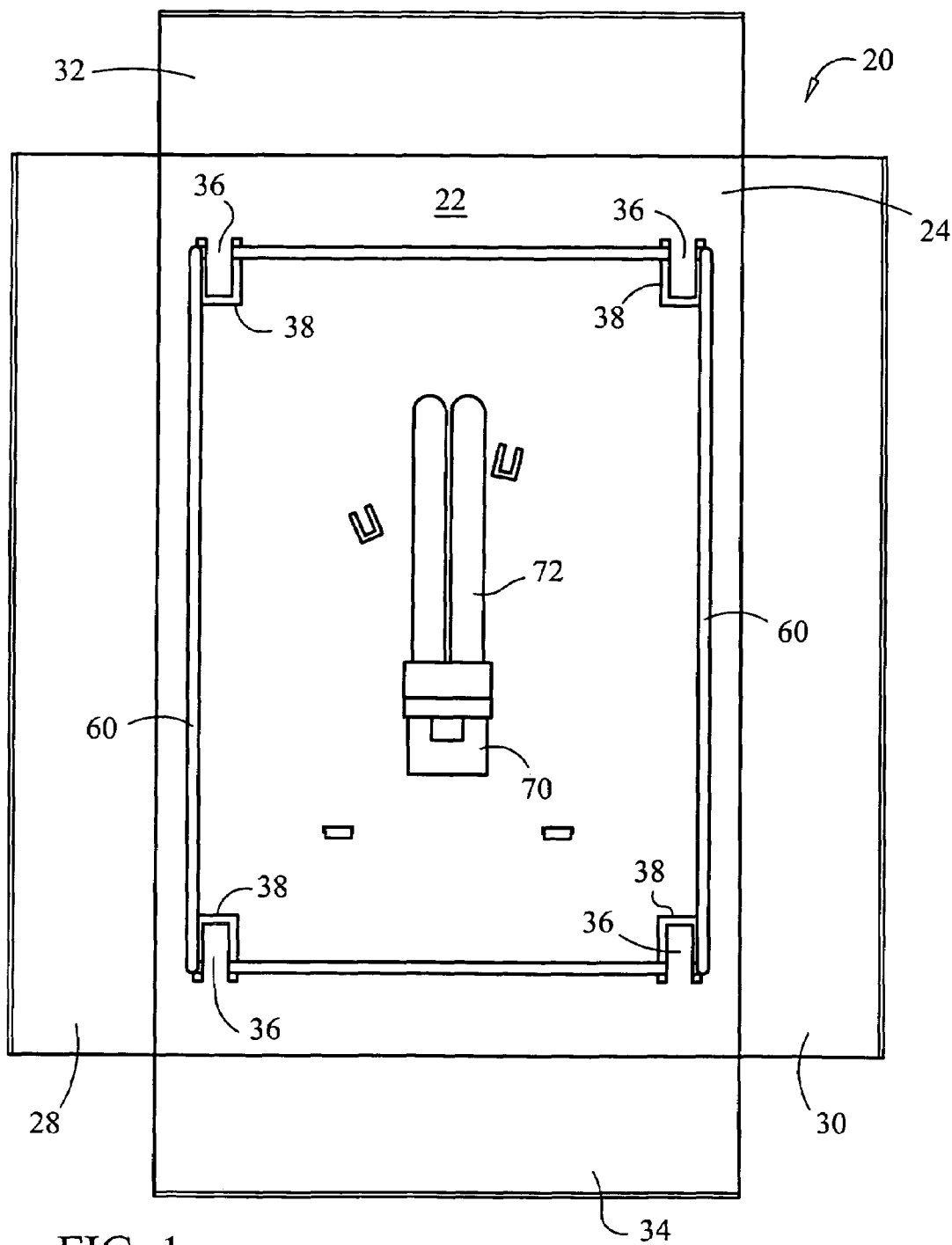
FIG. 1 is a front view of the present invention flying insect trap with the front cover removed.
Figure 2:
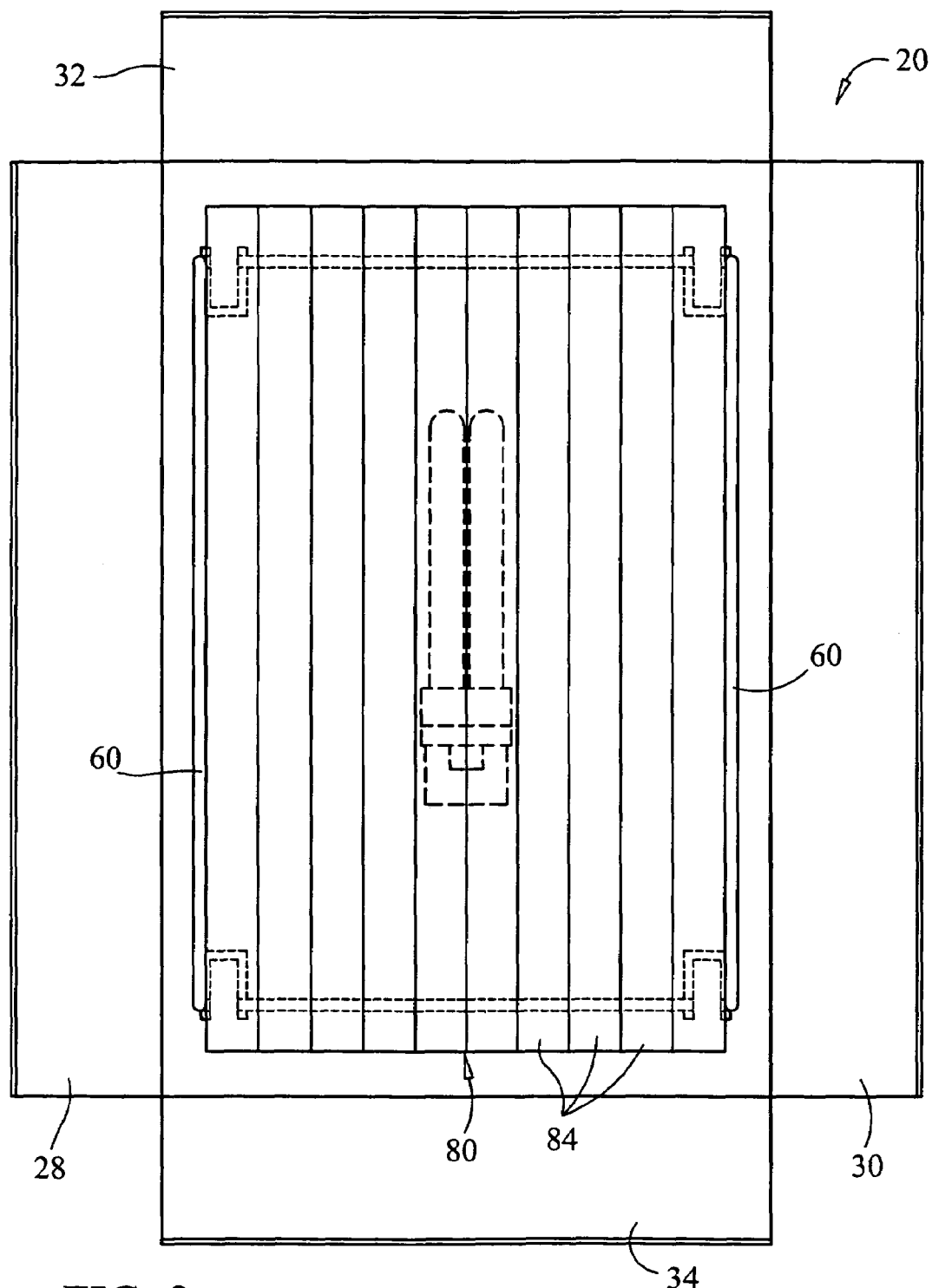
FIG. 2 is a front view of the present invention with the front cover attached to the rear cover.
Figure 3:
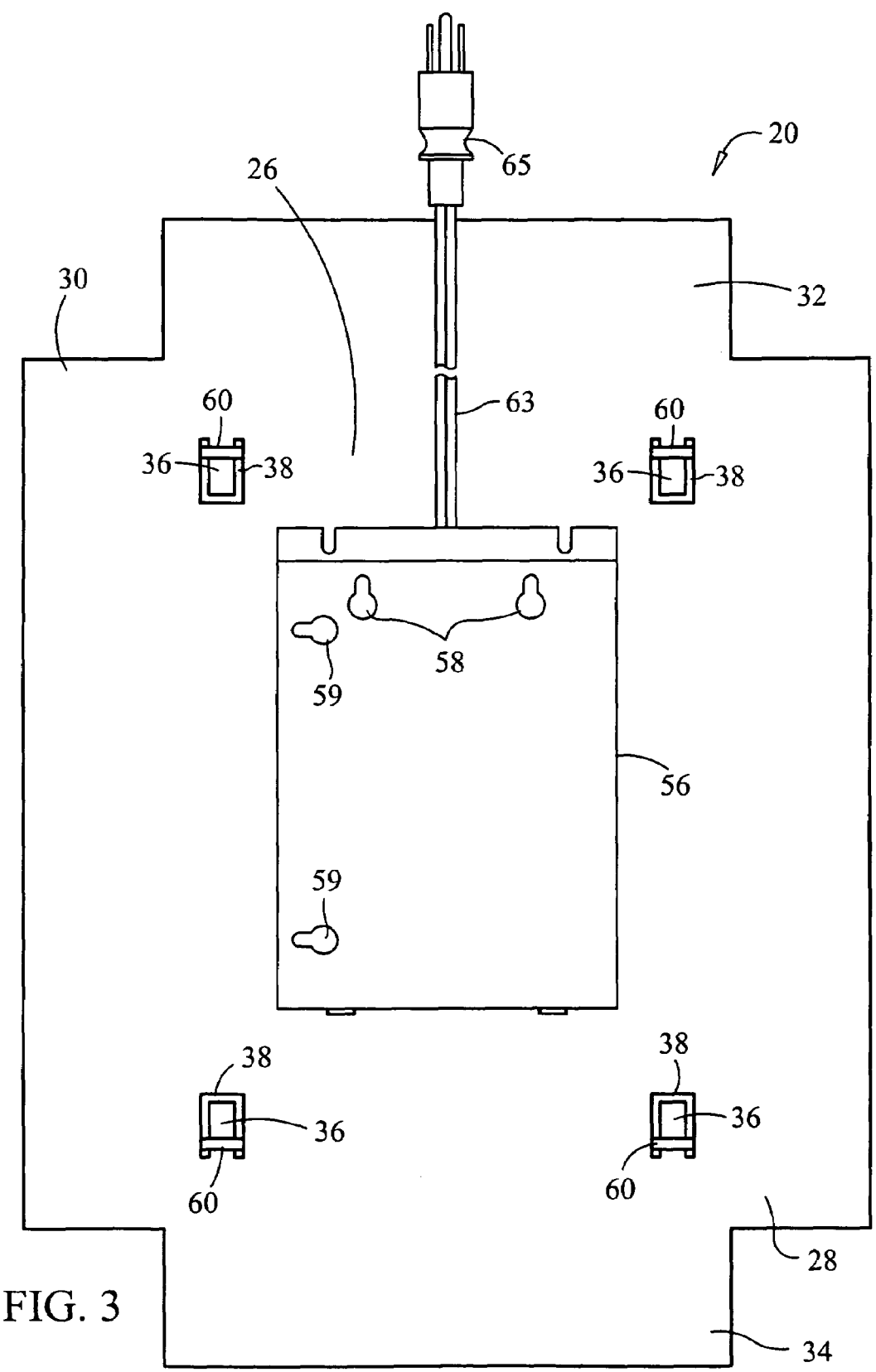
FIG. 3 is a rear view of the invention shown in FIGS. 1 and 2.
Figure 4:
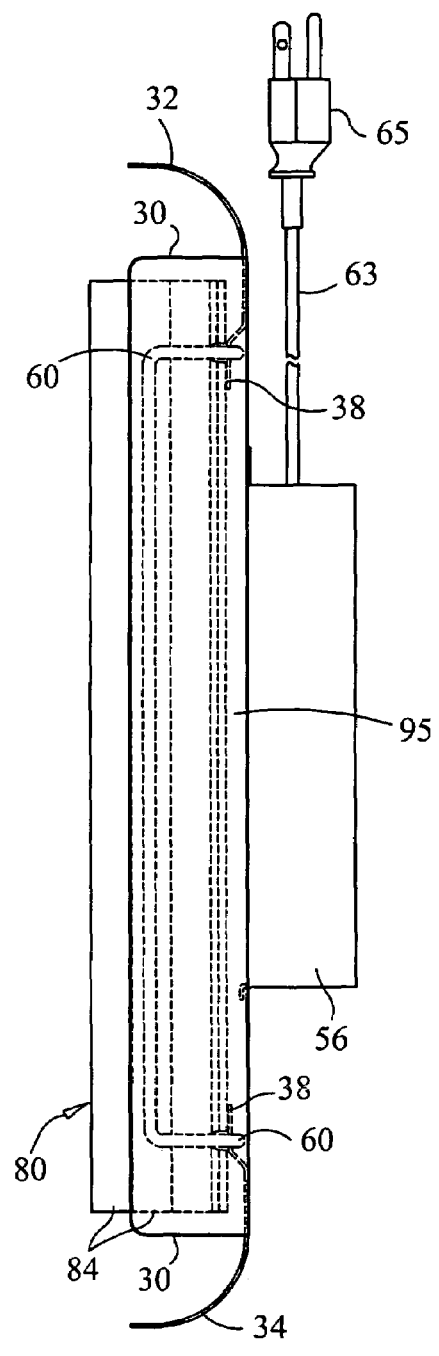
FIG. 4 is a right side view of the invention shown in FIGS. 1 and 2 with light socket and light bulb removed.
Figure 5:
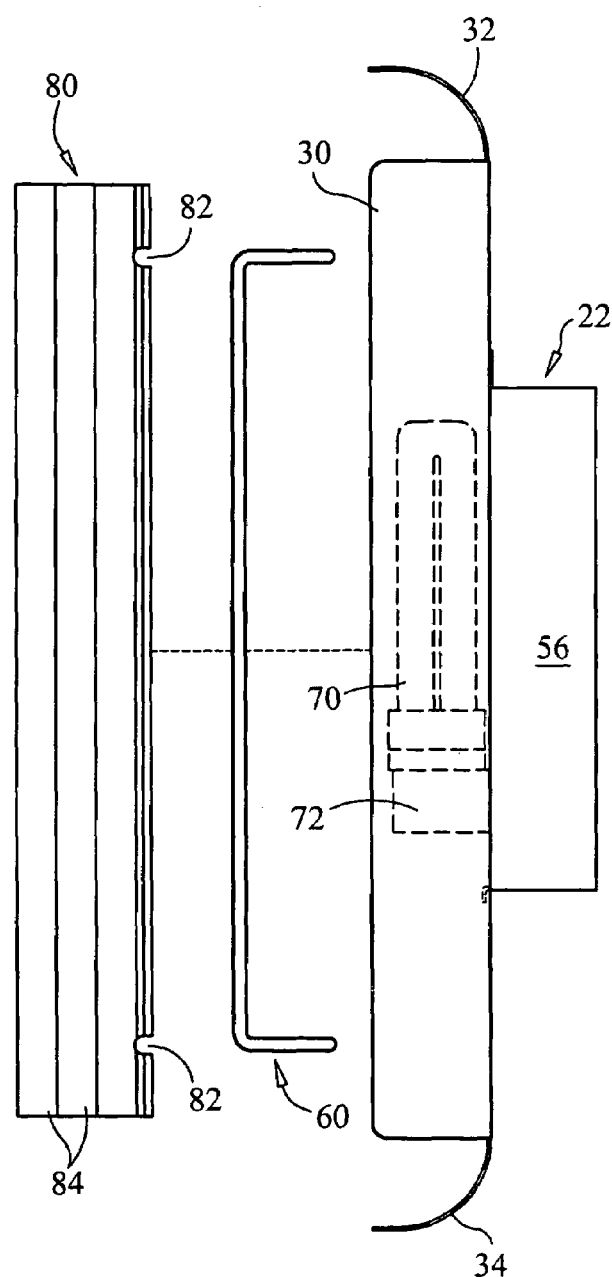
FIG. 5 is a right side exploded view of the invention shown in FIGS. 1 and 2.
Figure 6:
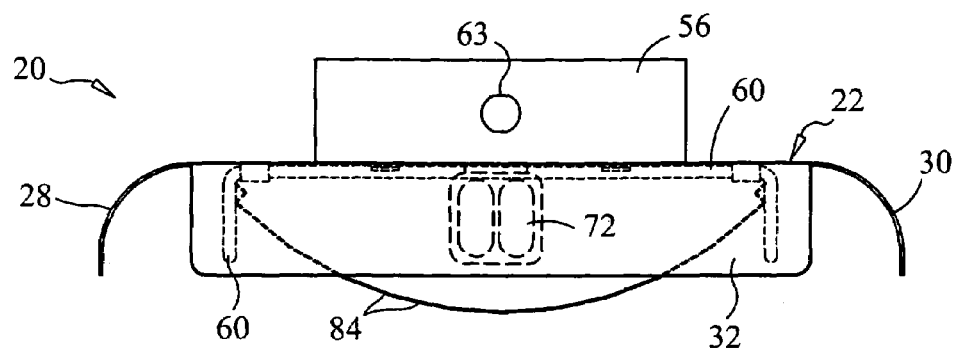
FIG. 6 is a top view of the invention shown in FIGS. 1 and 2.
Figure 7:
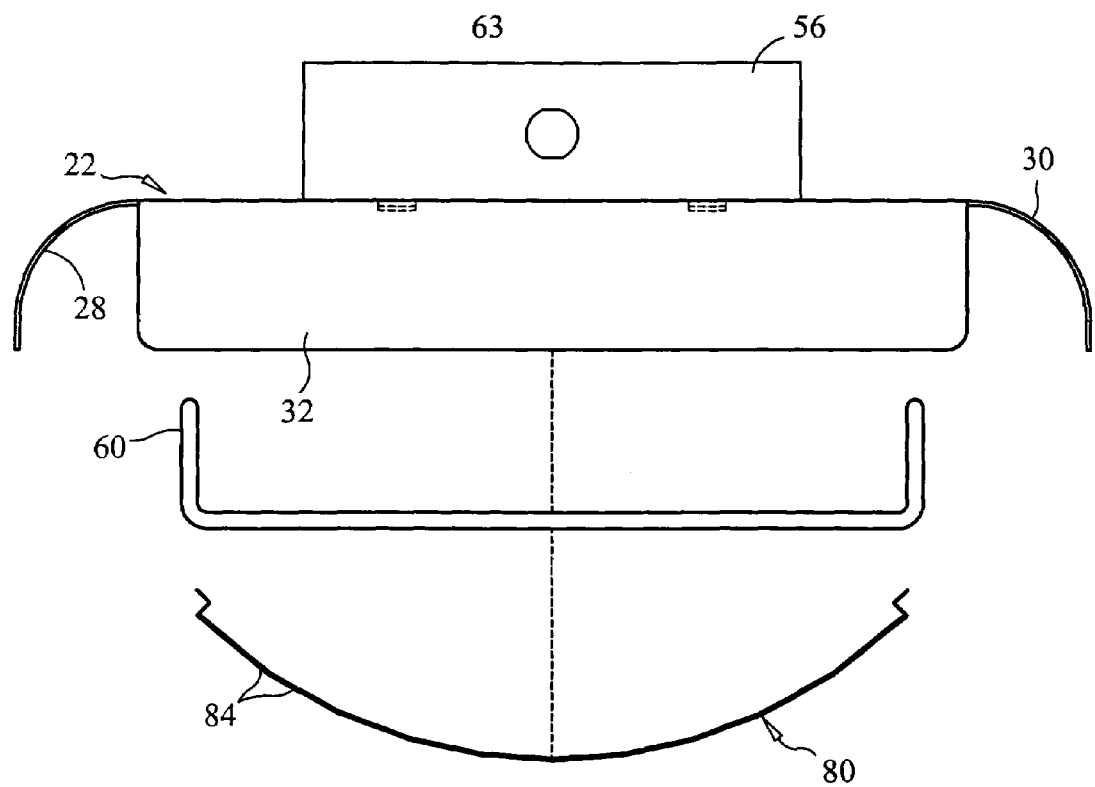
FIG. 7 is a top exploded view of the invention shown in FIGS. 1 and 2.

As seen in the drawings, an insect trap is provided for primarily attracting and capturing flying insects or bugs such as, but not limited to, flies. The trap can also be used to capture non-flying insects or buts, such as those that may climb up a wall of a room that the trap is mounted to. The insect trap is generally designated as reference numeral 20. Trap 20 can include a rear cover 22 which is connected to a separate and removable front cover 80. A light ballast or socket 70 can be attached to a front surface 24 of rear cover 22, and a mounting mechanism 56 can be attached to or otherwise associated with a back surface 26 of rear cover 22. Mounting mechanism 56 can also serve as a housing for the conventional wires or electronics (not shown) typically associated with light ballast/socket 70. An electrical cord 63, having a plug portion 65 can extend out of mounting mechanism 56.

Figure 9:
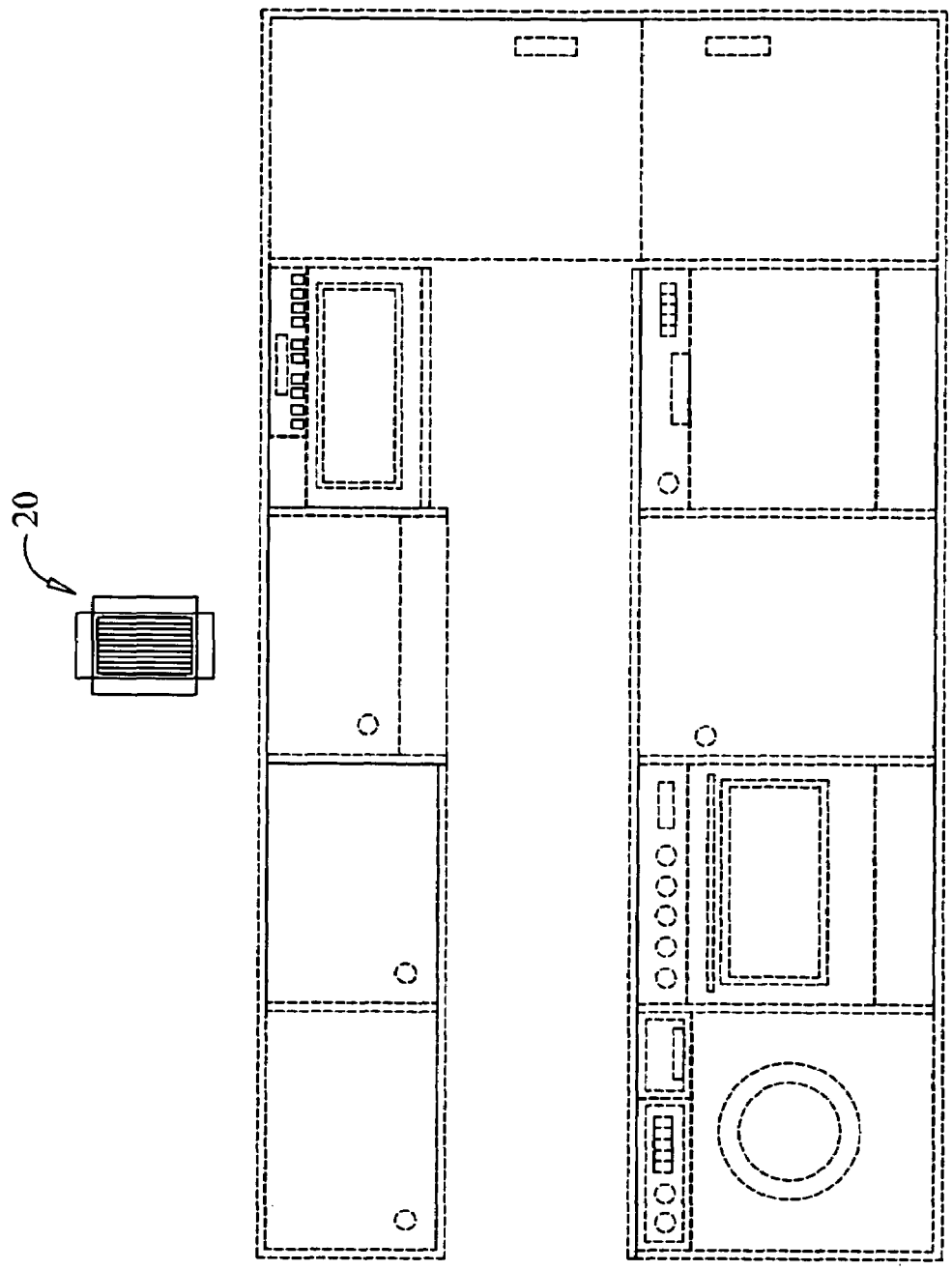
FIG. 9 is a perspective view showing the present invention attached to a wall of a room.
Figure 10:
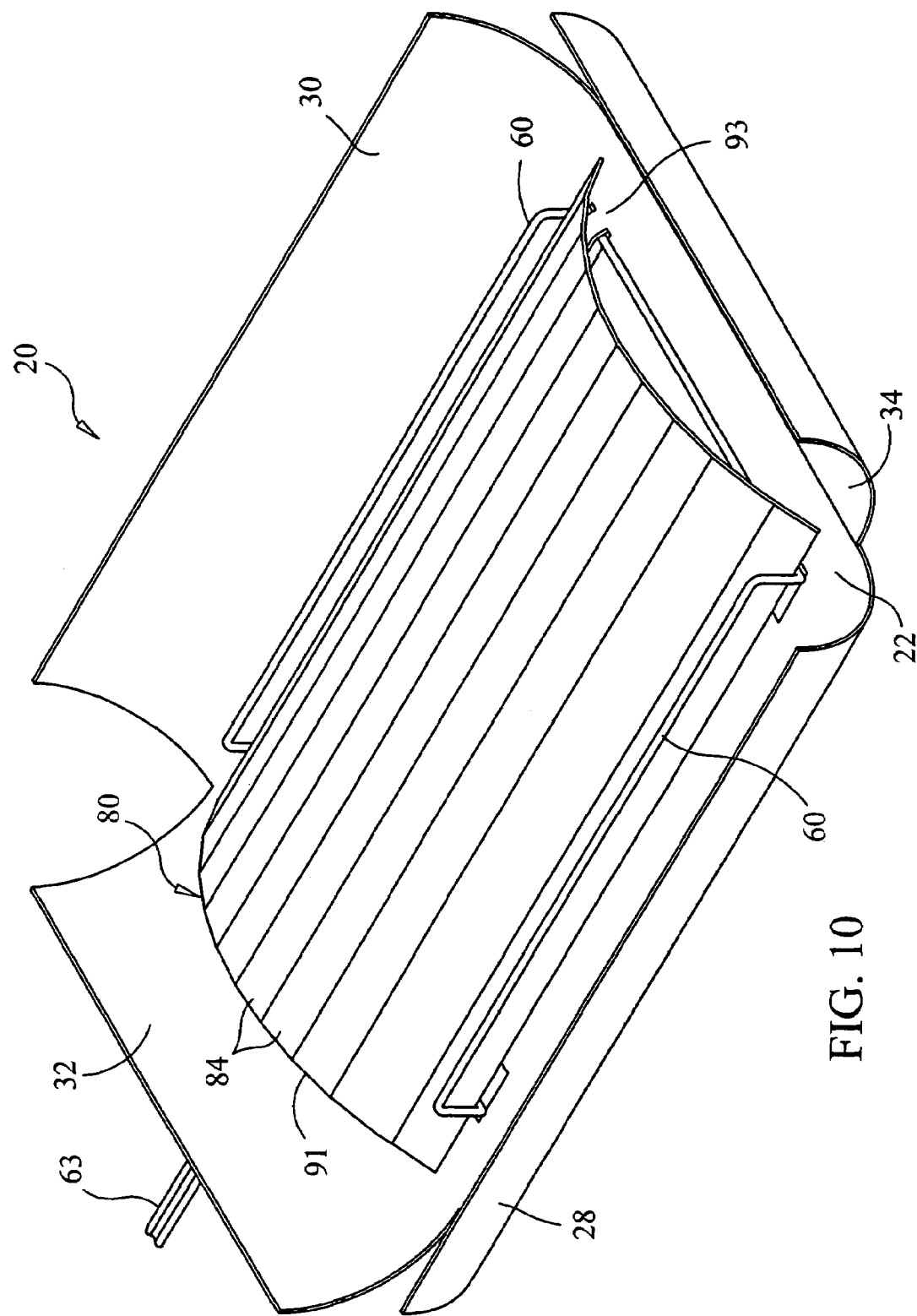
FIG. 10 is a perspective view of the present invention.

One or more holes 58 and/or one or more holes 60 can be provided for mounting trap 20 to an exterior or interior vertical surface. One example for use of trap 20 is shown in FIG. 9. Hole(s) 58 permit trap 20 to be attached in a vertical position, while hole(s) 60 permit trap 20 to be attached in a horizontal position. Other mounting mechanisms or devices, which do not interfere with the operation of trap 20, could be substituted for mounting mechanism 56 for attaching trap 20 to a wall or other object and are also considered within the scope of the invention.

In the preferred embodiment, rear cover 22 can be provided with a first inwardly rounded or curved side end 28, second inwardly rounded or curved side end 30, top inwardly rounded or curved end 32 and bottom inwardly rounded or curved end 34. Rear cover 22 can be constructed from various types of metals and other materials and is not considered limited to any particular type of material.

A wire support frame 60 can be secured to rear cover 22 and can protrude outward from front surface 24 of rear cover 22. In one securing frame securing embodiment, at least one and preferably a plurality of cutouts 38 in rear cover 22 are provided to define corresponding tab members 36. Though not considered limiting, the cutouts can be substantially "U" shaped. As best seen in FIG. 1, when attaching wire support frame 60 to rear cover 22, portions of the frame 60 are disposed under tab members 36 to maintain wire support frame 60 in place in conjunction with rear cover 22. Wire support frame can be constructed from a metal material however other materials can also be used and are considered within the scope of the invention.

Front cover 80 member can include one or more slots 82 for receipt of respective portions of wire support frame 60 to properly to secure front cover 80 to rear cover 22. In one embodiment wire support frame 60 can be a one piece member. However, such is not considered limiting and the support frame for attaching front cover 80 can be provided in multiple pieces, which may require some modification of how the multiple piece support frame is attached to rear cover 22. The thickness of wire support frame 60 is not considered limited to any particular dimensions. However, the frame should be sufficient in dimension to support and maintain front cover 80 in place.

Front cover 80 can be primarily round or rounded in shape and can be provided with a plurality of flat or slat portions 84. In one embodiment, front cover can be constructed from a metal or aluminum material and can have a shiny exterior appearance for its viewable or front/outer surface 86 and/or hidden (inner) or rear surface 88. Other materials can also be used and are considered within the scope of the invention. Front cover 80 can be a curved sheet formed of facets totaling a plurality of flats 84. Though not limiting, in one embodiment, nineteen flat portions 84 can be provided. However, such is not considered limiting and other numbers of equal dimensions or varying dimensions flat portions 84 can be provided and all are considered within the scope of the invention. Viewable surface 86 and/or hidden surface 88 can be polished by conventional means to further enhance the ornamental aspects of trap 20.

It should be recognized that different styles of slat portions are also within the scope of the invention, such as, but not limited to, unequal spacings between each or possibly eliminating slat portions 84 and replacing with a brushed, polished or smooth curved appearance. Additionally, in addition to aluminum as a material for constructing front cover 80, other metals such as stainless steel, brass, copper, etc. and other materials, separately or in various combinations, can be used and are considered within the scope of the invention. Though not considered limiting, the slat or flat portions are monolithically formed or constructed integral with each other.

Figure 8:
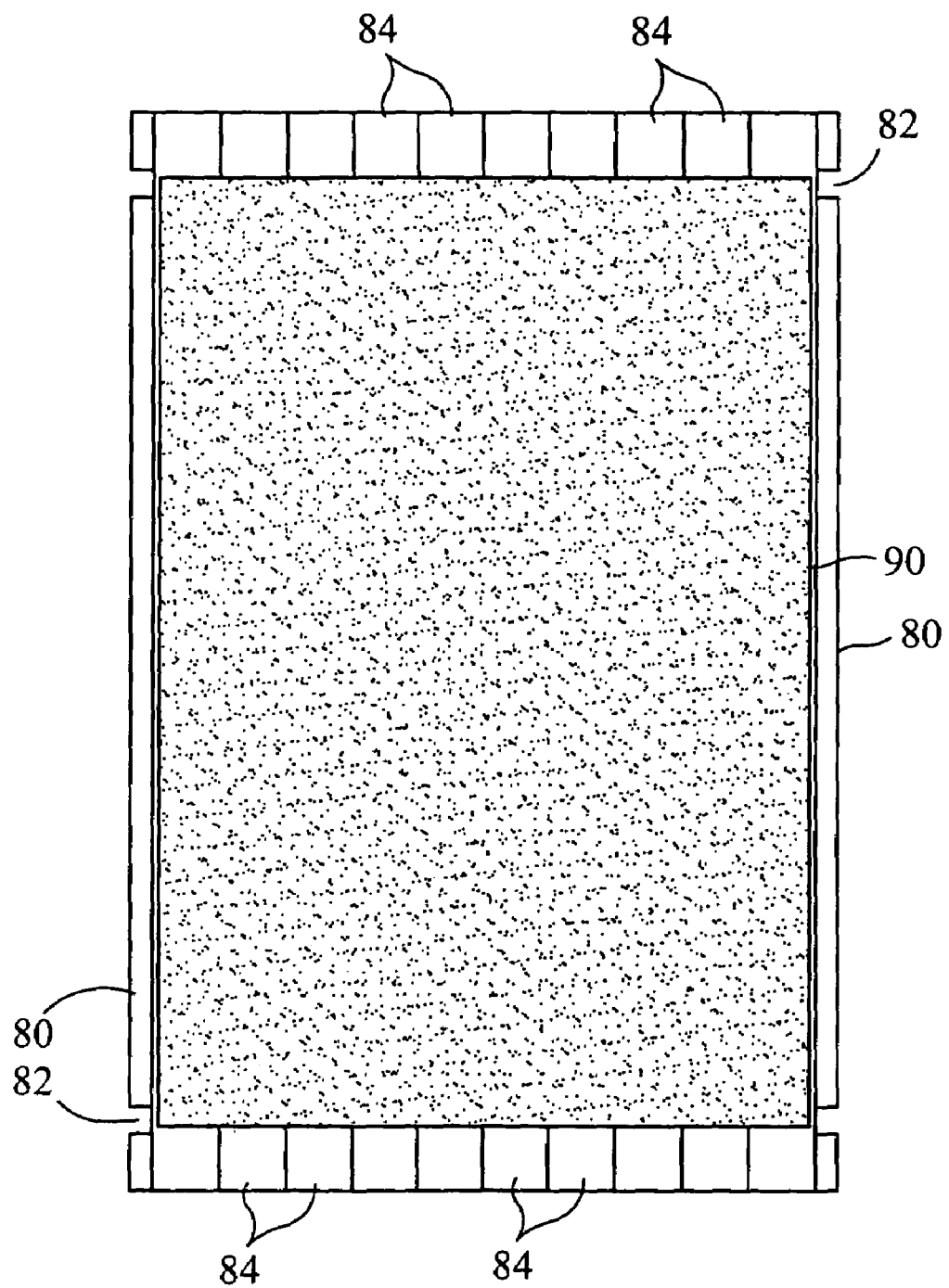
FIG. 8 is a rear view of the front cover of the invention shown in FIGS. 1 and 2.

As best seen in FIG. 8, an adhesive member, such as a sticky board 90, can be attached to hidden surface 88 of front cover 80 and can include a backing paper (not shown to protect the adhesive prior to its use. The adhesive member can cover a large portion of hidden surface 88 of front cover 80. However the size of the adhesive member is not considered limited to any particular dimensions or portion of hidden surface 88. Though not shown and not provided in the preferred embodiment, rear member 22 can also be provided with an adhesive member on at least a portion of either front surface 24 or rear surface 26. Though the sticky board 90 is the preferred adhesive member, other adhesive members which can be attached to surface 88 of front cover 80 and which will capture and retain insects can be used and are considered within the scope of the invention. At least a portion of sticky board 90, or other adhesive member, can be coated a UV resistant glue, such as, but not limited to, a UV resistant glue type 146 coated to minimum 80 GSM.

The location of sticky board 90 and any insects trapped on it allows it to be substantially if not completely hidden from view when in use. As mentioned above, sticky board 90 can be relatively large in size as compared to the overall size of trap 20, and therefore capable of holding a relatively large amount of insects/bugs. Additionally, sticky board 90 can be curved into the inside (hidden) surface 88 of front cover 80 and located by edge strips to permit it be self-retaining. The card portion of sticky board 90 to which the glue or adhesive is applied can be UV reflective. Sticky board 90 can also be provided with additives (previously used with stationary paper) to enhance the apparent "blueness" of the light that strikes the inside of the rear housing and increase the appearance of trap 20 in operation.

In use of trap 20, a light bulb or tube, such as but not limited to, compact fluorescent bulb or tube 72 is disposed within ballast/socket 70 and the backing paper is removed from its attachment to sticky board 90 in order to expose the adhesive portion of the sticky board. Front cover 80 can then be attached to rear cover 22 by placement of slots 82 of front cover 80 with the corresponding portions of wire frame 60, which is itself attached to rear cover 22 through cutout(s) 38 and tab(s) 36. Rear cover 22 is then mounted to a surface, such as but not limited to a vertical wall, by conventional means. Plug portion 65 of electrical cord 63 is then plugged into a conventional receptacle. Once plugged in, light from bulb or tube 72 is primarily and substantially retained within insect trap 20 by the capture of the light by the rounded side, top and bottom ends (28, 30, 32 and 34) of rear cover 22 and front cover 80. Direct light and/or light reflected off the exposed rear surface of front cover 80 and/or sticky board 90 illuminates the trap itself to attract flying insects, as well as non-flying insects.

In one embodiment, a minimal insignificant or minor amount of light may also protrude onto a small portion of the wall adjacent to the attachment position of trap 20 on the wall. The attachment of front cover 80 to rear cover 22, via support frame 60, can define an internal trap area having a top opening 91 and a bottom opening 93. Light is permitted to escape through both openings 91 and 93 and insects enter the internal trap area define between front cover 80 and rear cover 22 through either opening 91 or 93, where they are capture by the adhesive member, such as sticky board 90. The light that escapes through top opening 91 and bottom opening 93 is at least substantially captured by corresponding curved top end 32 and curved bottom end 34 of rear cover 22. Elongated side openings 95 can also be defined between front cover 80 and rear cover 22, when front cover 80 is properly attached or positioned with respect to rear cover 22, to permit light to escape and be captured by the rounded side ends 28 and 30 of rear cover 22. Thus insects and bugs, such as flies attracted to the light, will enter either through bottom opening 93 or top opening 91 or possibly one of side openings 95 and ultimately be caught or captured by the exposed adhesive on rear surface 88 of front cover 80. To replace the adhesive member and/or to change light bulb or tube 72, front member 80 is easily removed to permit easy access to the adhesive member and light bulb/tube 72.

In one embodiment the light 72 can be a compact fluorescent tube. Though not considered limiting, one such brand that can be used in the LYNX DE by Sylvania which has a power rating of 13 Watts. Other light bulbs and tubes can be used and all are considered within the scope of the invention.

In an alternative embodiment, one or more profiled corners of rear cover 22 can be located behind and offset from the main body of the trap 20. These profiled corners can act as an ornamental feature by catching any light that spills out from the corners and at the same time prevents it from striking the mounting surface (i.e. wall, etc.). It's a known fact that UV light can cause discoloration of some wall finishes and this alternative embodiment would create an insect trap that provides additional protection for the mounting surface. Other versions of the traps can be provided to incorporate different wattages and sizes of tubes, which may necessitate the overall dimensions of the insect trap having to be modified.

The instant invention has been shown and described herein in what is considered to be the most practical and preferred embodiment. While the invention has been described and disclosed in certain terms and has disclosed certain embodiments or modifications, persons skilled in the art, who have acquainted themselves with the invention, will appreciate that it is not necessarily limited by such terms, nor to the specific embodiments and modifications disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. An insect trap, comprising:
a rear member having a front surface and a back surface, said rear member having an inwardly curved top end, inwardly curved bottom end, inwardly curved first side end and an inwardly curved second side end;
a front cover removably attached to a front surface of said rear member to define an internal trap area having an open top end and an open bottom end;
a light assembly disposed within said internal trap area;
an adhesive member disposed within said internal trap area; and
wherein light from said light assembly is substantially retained by the curved ends of said rear member and said front cover to illuminate said rear member and attract insects into the internal trap area for capture by said adhesive member;
a frame member attached to said rear member and having a first frame portion and a second frame portion; wherein said front cover having a first pair of slots and a second pair of slots; wherein said first frame portion mates with said first pair of slots and said second frame portion mates with said second pair of slots when attaching said front cover to said rear member.

2. The insect trap of claim 1 wherein a first opening is defined between said inwardly curved top end and said inwardly curved first side, a second opening is defined between said inwardly curved bottom end and said inwardly curved first side, a third opening is defined between said inwardly curved top end and said inwardly curved second side, and a fourth opening is defined between said inwardly curved bottom end and said inwardly curved second side.

3. The insect trap of claim 1 wherein said adhesive member is disposed on a substantial portion of an inner surface of said front cover.

4. The insect trap of claim 1 wherein said adhesive member is a sticky board.

5. The insect trap of claim 4 further comprising backing paper disposed over said sticky board prior to use of the insect trap and which is removed at the time of use of the insect trap.

6. The insect trap of claim 1 wherein said front cover having a substantially rounded portion.

7. The insect trap of claim 1 wherein said front cover having a plurality of monolithically formed slat sections which define a substantially circular portion of said front cover.

8. The insect trap of claim 1 wherein said front cover having a shiny outer surface.

9. The insect trap of claim 1 wherein said front cover having a shiny inner surface.

10. The insect trap of claim 1 wherein said front cover having a shiny inner surface.

11. The insect trap of claim 1 further comprising means for mounting said rear cover to a wall of a room.

12. The insect trap of claim 1 wherein said light assembly is attached to said rear cover.

13. An insect trap, comprising:
a rear member having a front surface and a back surface, said rear member having an inwardly curved top end, inwardly curved bottom end, inwardly curved first side end and an inwardly curved second side end;
a front cover removably attached to a front surface of said rear member to define an internal trap area having an open top end and an open bottom end;
a light assembly disposed within said internal trap area; and
an adhesive member disposed within said internal trap area;
wherein light from said light assembly is substantially retained by the curved ends of said rear member and said front cover to illuminate said rear member and attract insects into the internal trap area for capture by said adhesive member;
wherein said front cover having a plurality of monolithically formed slat sections which define a substantially circular portion of said front cover;
wherein said front cover having a first flange member disposed at a first side of said substantially circular portion and a second flange member disposed at a second side of said substantially circular portion.

14. The insect trap of claim 13 further comprising a frame member attached to said rear member and having a first frame portion and a second frame portion, wherein said first flange member of said front cover having a first pair of slots and said second flange member of said front cover having a second pair of slots; wherein said first frame portion mates with said first pair of slots and said second frame portion mates with said second pair of slots when attaching said front cover to said rear member.

15. The insect trap of claim 13 wherein said first flange member and said second flange member are monolithically formed with said substantially circular portion.

16. An insect trap, comprising:
a rear member having a front surface and a back surface, said rear member having an inwardly curved top end, inwardly curved bottom end, inwardly curved first side end and an inwardly curved second side end;
a frame member attached to said rear member and having a first frame portion and a second frame portion;
a front cover removably attached to a front surface of said rear member to define an internal trap area having an open top end and an open bottom end, wherein said front cover having a plurality of monolithically formed slat sections which define a substantially circular portion of said front cover, said front cover having a first flange member disposed at a first side of said substantially circular portion and a second flange member disposed at a second side of said substantially circular portion, said first flange member having a first pair of slots and said second flange member having a second pair of slots;
a light assembly attached to said rear cover and disposed within said internal trap area; and
an adhesive member disposed within said internal trap area;
wherein said first frame portion mates with said first pair of slots and said second frame portion mates with said second pair of slots when attaching said front cover to said rear member;
wherein light from said light assembly is substantially retained by the curved ends of said rear member and said front cover to illuminate said rear member and attract insects into the internal trap area for capture by said adhesive member.

17. The insect trap of claim 16 wherein a first opening is defined between said inwardly curved top end and said inwardly curved first side, a second opening is defined between said inwardly curved bottom end and said inwardly curved first side, a third opening is defined between said inwardly curved top end and said inwardly curved second side, and a fourth opening is defined between said inwardly curved bottom end and said inwardly curved second side.

18. The insect trap of claim 16 wherein said adhesive member is a sticky board that is disposed on a substantial portion of an inner surface of said front cover.

19. The insect trap of claim 18 further comprising backing paper disposed over said sticky board prior to use of the insect trap and which is removed at the time of use of the insect trap.

20. The insect trap of claim 16 wherein said front cover having a shiny outer surface and shiny inner surface.

21. The insect trap of claim 16 further comprising means for mounting said rear cover to a wall of a room.

22. An insect trap, comprising:
a rear member having a front surface and a back surface, said rear member having an inwardly curved top end, inwardly curved bottom end, inwardly curved first side end and an inwardly curved second side end;
a frame member attached to said rear member and having a first frame portion and a second frame portion;
a front cover removably attached to a front surface of said rear member to define an internal trap area having an open top end and an open bottom end, wherein said front cover having a substantially circular portion and a first flange member disposed at a first side of said substantially circular portion and a second flange member disposed at a second side of said substantially circular portion, said first flange member having a first pair of slots and said second flange member having a second pair of slots;
a light assembly attached to said rear cover and disposed within said internal trap area; and
an adhesive member disposed within said internal trap area;
wherein said first frame portion mates with said first pair of slots and said second frame portion mates with said second pair of slots when attaching said front cover to said rear member;
wherein light from said light assembly is substantially retained by the curved ends of said rear member and said front cover to illuminate said rear member and attract insects into the internal trap area for capture by said adhesive member.

23. The insect trap of claim 22 wherein a first opening is defined between said inwardly curved top end and said inwardly curved first side, a second opening is defined between said inwardly curved bottom end and said inwardly curved first side, a third opening is defined between said inwardly curved top end and said inwardly curved second side, and a fourth opening is defined between said inwardly curved bottom end and said inwardly curved second side.

24. The insect trap of claim 22 wherein said adhesive member is a sticky board that is disposed on a substantial portion of an inner surface of said front cover.

25. The insect trap of claim 24 further comprising backing paper disposed over said sticky board prior to use of the insect trap and which is removed at the time of use of the insect trap.

26. The insect trap of claim 22 wherein said front cover having a shiny outer surface and shiny inner surface.

27. The insect trap of claim 22 further comprising means for mounting said rear cover to a wall of a room.

28. An insect trap, comprising:
a rear member having a front surface and a back surface, said rear member having an inwardly curved top end, inwardly curved bottom end, inwardly curved first side end and an inwardly curved second side end;
a frame member attached to said rear member and having a first frame portion and a second frame portion;
a front cover removably attached to a front surface of said rear member to define an internal trap area having an open top end and an open bottom end, wherein said front cover having a plurality of monolithically formed slat sections which define a substantially circular portion of said front cover, said front cover having a first flange member disposed at a first side of said substantially circular portion and a second flange member disposed at a second side of said substantially circular portion, said first flange member having a first pair of slots and said second flange member having a second pair of slots, said front cover having a shiny outer surface and shiny inner surface;

a light assembly attached to said rear cover and disposed within said internal trap area; and an adhesive member disposed on a substantial portion of an inner surface of said front cover;

wherein said first frame portion mates with said first pair of slots and said second frame portion mates with said second pair of slots when attaching said front cover to said rear member;

wherein light from said light assembly is substantially retained by the curved ends of said rear member and said front cover to illuminate said rear member and attract insects into the internal trap area for capture by said adhesive member;

wherein a first opening is defined between said inwardly curved top end and said inwardly curved first side, a second opening is defined between said inwardly curved bottom end and said inwardly curved first side, a third opening is defined between said inwardly curved top end and said inwardly curved second side, and a fourth opening is defined between said inwardly curved bottom end and said inwardly curved second side.

29. The insect trap of claim 28 wherein said adhesive member is a sticky board.

30. The insect trap of claim 29 further comprising backing paper disposed over said sticky board prior to use of the insect trap and which is removed at the time of use of the insect trap.

31. The insect trap of claim 28 further comprising means for mounting said rear cover to a wall of a room.

* * * * *